Nov. 11, 1958 F. BUCHHOLTZ 2,860,194

CIRCUIT ARRANGEMENT FOR THE TRANSMISSION OF SIGNALS

Filed Sept. 21, 1954 3 Sheets-Sheet 1

INVENTOR
F. BUCHHOLTZ

BY Philip M. Bolton
ATTORNEY

INVENTOR
F. BUCHHOLTZ

BY Philip M. Bolton
ATTORNEY

INVENTOR
F. BUCHHOLTZ
BY Philip M. Bolton
ATTORNEY

United States Patent Office 2,860,194

Patented Nov. 11, 1958

2,860,194

CIRCUIT ARRANGEMENT FOR THE TRANSMISSION OF SIGNALS

Friedrich Buchholtz, Stuttgart-Zuffenhausen, Germany, assignor to International Standard Electric Corporation, New York, N. Y., a corporation of Delaware

Application September 21, 1954, Serial No. 457,516

Claims priority, application Germany September 25, 1953

4 Claims. (Cl. 179—171)

It is often necessary in communications transmission systems to transmit signals from different sources independently of each other to a common transmission path. Consequently it is demanded that the individual signals have to be transferred in a decoupled manner to the common transmission system. Apart therefrom it may be desirable to control the different signals independently of one another. With the hitherto conventional circuit arrangements these requirements caused a relatively high expenditure of decoupling means.

When regarding e. g. the pilot frequency feeding in carrier wave signalling systems as being the present state of art, then it was hitherto the common practice to feed-in the different signals via special decoupling devices arranged either in front or behind a final- or transmitting-amplifier.

Fig. 1 as an example, shows one conventional arrangement of this kind. The signals $S_1$ and $S_2$ are admitted from different signal sources and each via a variable artificial extension line V11 and V12 and via a common decoupling network E to the transmitting amplifier V*s*, whose gain can be controlled with the aid of a level controlled NR. Both of the amplified signals ($v_1.S_1$; $v_2.S_2$) can be controlled separately by means of the artificial extension lines V11 and V12.

Since the signal band to be transmitted is generally a very great one, very high demands have to be asked for from the decoupling means with respect to the frequency response characteristics of the impedances etc. Such decoupling networks arranged in the transmission path are the cause of an additional decoupling loss $b_E$, which has to be compensated again by correspondingly increasing the gain of the transmitting amplifier V*s*, so that the level of the signal band $S_1$ exhibits its nominal value $p_{S_1}$ at the output of the amplifier V*s*.

The signal $S_2$, fed-in via the decoupling network, is likewise supposed to have a predetermined level $p_{S_2}$ at the output of the amplifier. In this respect there is often demanded an exactly defined and constant distance or space between the two level values.

The two variable artificial extension lines V11 and V12 are subject to the additional losses $b_{V11}$ and $b_{V12}$, which likewise have to be compensated again in the transmitting amplifier.

The necessary increase of the gain in the transmitting amplifier V*s* causes a deterioration of the non-linear attenuation and probably even an additional expenditure on tubes.

It is the object of this invention, irrespectively of this particular field of practical application, to provide a circuit arrangement enabling, without the employment of decoupling networks, the transmission of signals which are fed-in from different signal sources and which are reciprocally decoupled and capable of being separately controlled, to a common output circuit.

This will be achieved by providing an inverse feedback amplifier, to the input grid circuit of which there are applied the signals originating with the one source, whereas the signals originating with the other source are fed into the negative feedback circuit.

The invention will now be described with reference to a particular example of embodiment by using the partially already discussed figures of the copending drawings.

Figure 3:
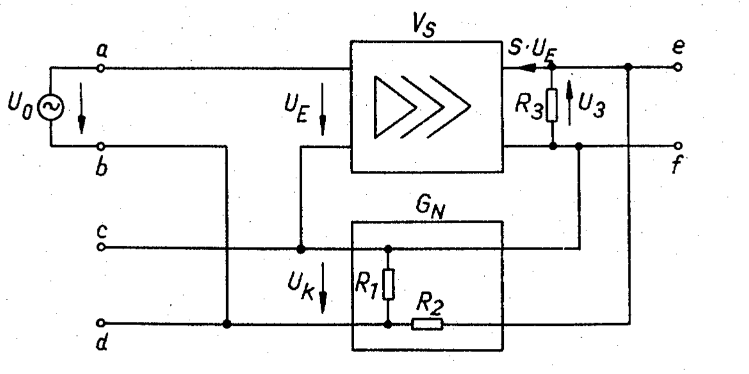
Figure 4:
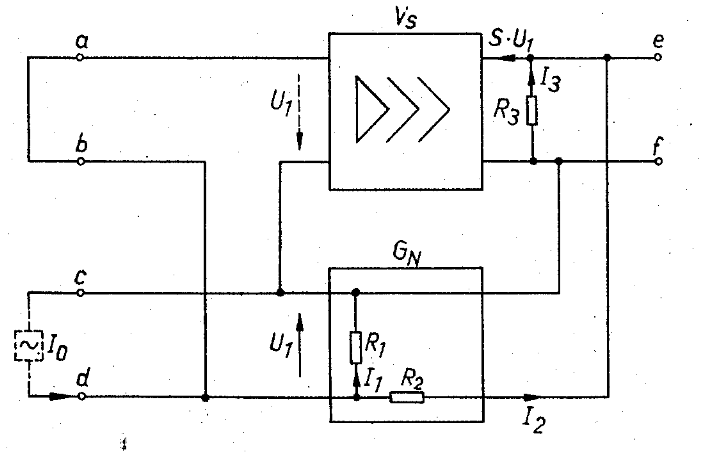
Figure 5:
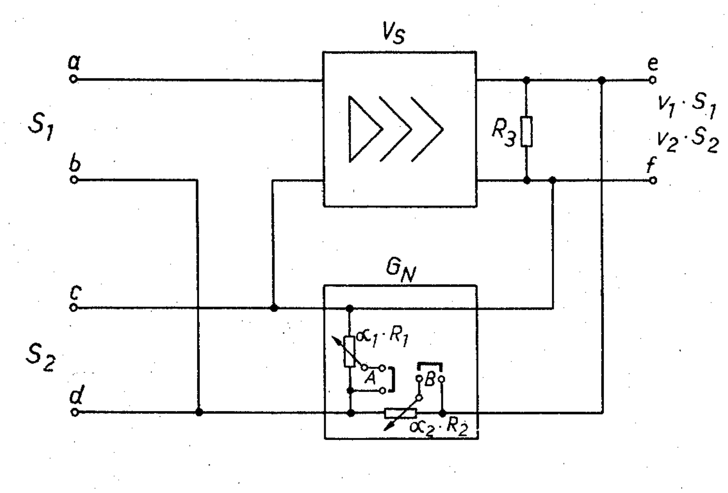
Figure 6:
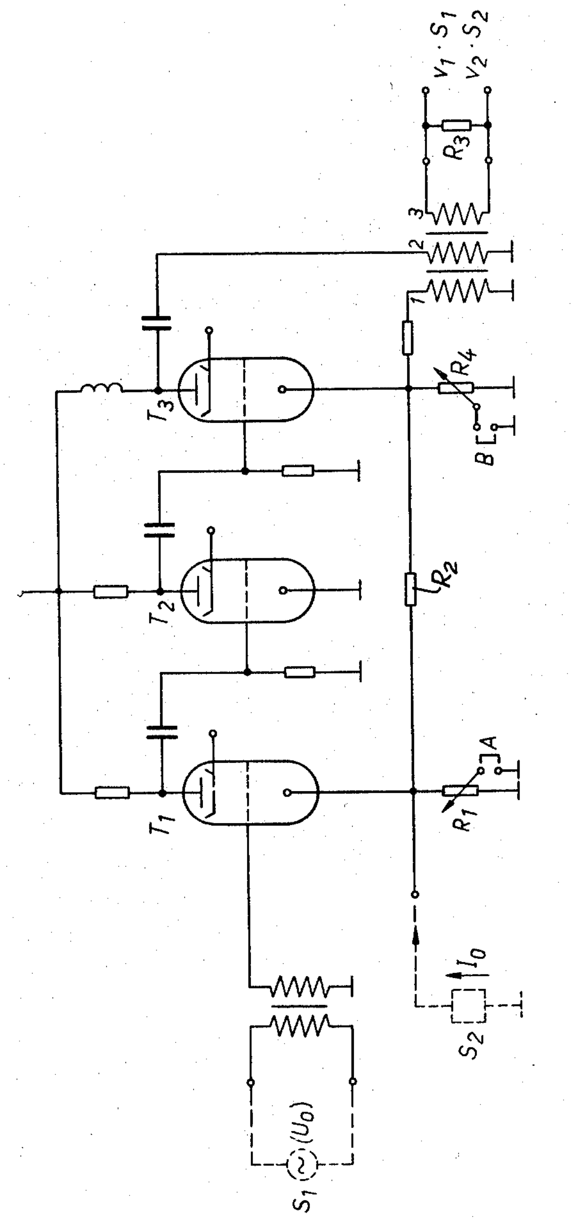

Fig. 3 explains the voltage amplification on principles,

Fig. 4 explains the current amplification on principles,

Fig. 5 serves to explain the regulating or control possibilities,

Fig. 6 shows a basic circuit diagram relating to the invention.

Figure 1:
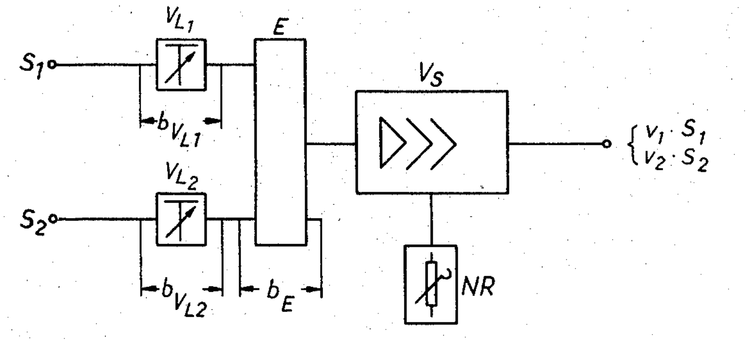
Fig. 1 shows a block diagram relating to the state of art.
Figure 2:
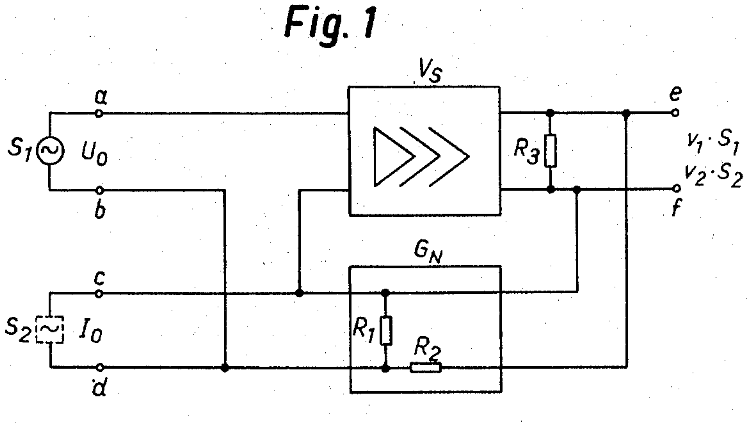
Fig. 2 shows a basic circuit diagram according to the present invention.

Fig. 2 on principle shows the arrangement of an exemplified embodiment according to the invention. The two signals originating with different sources are denoted by $S_1$ and $S_2$. The signal $S_1$ with the voltage $U_0$ is applied to the terminals *a*—*b* of an amplifier. To the terminals *c*—*d* there is applied the signal $S_2$ with the current *Io* impressed by the input side. $R_3$ denotes the output load resistance lying between the terminals *e*—*f*. From these terminals *e*—*f* there is tapped the output voltage and is applied to the negative feedback network GN which, e. g. consists of the resistances $R_1$ and $R_2$. The amplification of $S_1$ is denoted by $v_1$, and that of $S_2$ by $v_2$.

In Fig. 3 there is explained the mode of operation of the arrangement for the amplification $v_1$ of the signal $S_1$ (voltage amplification).

$U_0$ denotes the original voltage
$U_E$ denotes the input voltage of the amplifier V*s*
$U_K$ denotes the negative feedback voltage
$U_3$ denotes the output voltage across $R_3$
S denotes the effective transconductance of the amplifier V*s*
$S.U_E$ denotes the output current of the amplifier V*s* at an input voltage $U_E$ According to Fig. 3

$$U_K=\frac{R_1}{R_1+R_2}\cdot U_3 \qquad (1)$$

and $$U_3=S\cdot(U_0-U_K)\cdot\frac{R_3(R_1+R_2)}{R_1+R_2+R_3} \qquad (2)$$

when inserting (1) in (2), there will be $$U_3=S\cdot U_0\cdot\frac{R_3(R_1+R_2)}{R_1+R_2+R_3}-S\cdot\frac{R_3\cancel{(R_1+R_2)}}{R_1+R_2+R_3}\cdot\frac{R_1}{\cancel{(R_1+R_2)}}\cdot U_3$$

The amplification $v_1$ of the signal $S_1$—in the present case the signal $S_1=U_0$—will then become:

$$v_1=\frac{U_3}{U_0}=\frac{S\cdot\frac{R_3(R_1+R_2)}{R_1+R_2+R_3}}{1+S\cdot\frac{R_3\cdot R_1}{R_1+R_2+R_3}}=$$

$$\frac{R_1+R_2}{\frac{R_1+R_2+R_3}{S\cdot R_3}+R_1} \quad \text{with } S\rightarrow\infty$$

$$v_{1(S\rightarrow\infty)}=\frac{U_3}{U_{0(S\rightarrow\infty)}}=\frac{R_1+R_2}{R_1}=1+\frac{R_2}{R_1}$$

Hence it will be obvious that the amplification $v_1$ depends on $R_1$ and $R_2$, and that this gain can be controlled with the aid of a variable $R_1$ and $R_2$.

The amplification $v_2$ of the signal $S_2$ is explained with reference to Fig. 4.

$J_0$ denotes the supplied current
$U_1$ denotes the input voltage of the amplifier $Vs$ which becomes effective
$J_1$ denotes the current across $R_1$
$J_2$ denotes the current across $R_2$
$J_3$ denotes the current across $R_3$
S denotes the effective transconductance of $Vs$
$S.U_1$ denotes the output current of the amplifier $Vs$ in the case of the input voltage $U_1$ becoming effective.

According to Fig. 4

$U_1=J_1.R_1$ and consequently $S.U_1=S.(J_1.R_1)$

There are established the following relationships $$J_1+J_2=J_0$$
$$J_1(S.R_1)-J_2-J_3=0$$
$$-J_1R_1+J_2R_2-J_3R_3=0$$

When solving the equations according to $J_3$ and by converting, there will be obtained $$-J_3[(1-SR_2)R_1+(1+SR_1)(R_2+R_3)]=J_0.(1-SR_2).R_1$$

and therefrom the amplification $v_2$ of the signal $S_2$ $$v_2=\frac{J_3}{J_0}=\frac{-R_1+S\cdot R_1\cdot R_3}{R_1+R_2+R_3+S\cdot R_1\cdot R_3}=\frac{-\frac{R_1}{S}+R_1\cdot R_2}{\frac{R_1+R_2+R_3}{S}+R_1\cdot R_3}$$

and finally $$v_2=\frac{J_3}{J_{0(S\to\infty)}}=\frac{R_2}{R_3}$$

Accordingly, the amplification $v_2$ of the signal $S_2$ is independent of $R_1$ in the limiting case $(S\to\infty)$ and is capable of being controlled with the aid of $R_2$.

Fig. 5 on principle shows how the selective control of the amplification of $v_1$ and $v_2$ is practically carried out. The corresponding designations are the same as in the preceding figures.

$v_1$ denotes the amplification of the signal $S_1$
$v_2$ denotes the amplification of the signal $S_2$ $$\alpha_1=f_1(\alpha)$$
$$\alpha_2=f_2(\alpha)$$

denotes the given functional dependence of the variable resistances $R_1$ and $R_2$.

With a bridge arranged at A $$v_1=1+\frac{R_2}{\alpha_1 R_1}$$

becomes variable with $\alpha_1$ and $$v_2=\frac{R_2}{R_3}=\text{constant}$$

With a bridge arranged at B $$v_1=1+\frac{\alpha_2 R_2}{R_1}$$

becomes variable with $\alpha_2$ $$v_2=\frac{\alpha_2 R_2}{R_3}$$

becomes variable with $\alpha_2$.

With bridges arranged at A and B $$v_1=1+\frac{\alpha_1 R_2}{\alpha_2 R_1}=1+\frac{\alpha_1}{\alpha_2}\cdot\frac{R_2}{R_1}$$

becomes variable with $\alpha_1$ and $\alpha_2$ $$v_2=\frac{\alpha_2 R_2}{R_3}$$

becomes variable or controllable with $\alpha_2$ for $$\left.\begin{matrix}\alpha_1=k_1\cdot\alpha\\ \alpha_2=k_2\cdot\alpha\end{matrix}\right\}\text{there becomes } v_1v=1+\frac{k_1}{k_2}\cdot\frac{R_2}{R_1}=\text{constant}$$

Hence it can be recognized that (1) At an inserted bridge A the amplification $v_1$ of the signal $S_1$ can be controlled, whilst the amplification $v_2$ of the signal $S_2$ remains constant;

(2) At an inserted bridge B the amplifications for both signals can be controlled proportionally, and that (3) In the case of inserted bridges A and B the amplification $v_1$ will now remain constant, whilst the amplification $v_2$ is capable of being controlled.

In Fig. 6 of the copending drawings there is shown a basic circuit diagram for a three-tube amplifier which is built up according to the present invention. The designations are the same as those used in the preceding figures. The signal $S_1$ with the voltage $U_0$ is applied via an input transformer to the amplifier, whilst the signal $S_2$ with the current $I_0$ is fed into the negative feedback circuit.

The control is effected at $R_1$ by means of bridge A for $v_1$, thereby $v_2$ will remain constant. With the aid of a bridge B at $R_4$, $v_1$ and $v_2$ will be controlled in common. With both of the bridges it will be possible e. g. to control $v_2$ with $v_1$=constant. With the aid of the bridges it is possible to control the signals either independently of each other or in common.

The present state of art and the therefrom resulting setting of the problem was taken from the fields of carrier frequency technique. From this there also results e. g. a particular applicability of the present invention to the pilot frequency feed-in in carrier wave signalling systems.

The invention has been described hereinbefore with reference to an example of embodiment. This, however, in no way represents a limitation to the scope of the invention and its range of practical application.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An amplifying circuit for the transmission of two signals simultaneously without intermodulation comprising two sources of respectively different signals of similar amplitude, a common linear amplifier therefor connected to each source, said amplifier having a negative feedback path to which one of said sources is connected and a forward amplifying path to which the other source is connected, means in said feedback path for separately controlling the amplification of each of said signals, and a common load for said signals connected to said amplifier.

2. The amplifying circuit of claim 1, wherein the means in said feedback path are variable, linear passive impedances for controlling the amplification of each of said signals selectively.

3. The amplifying circuit of claim 2, wherein said amplifier comprises three electron tubes coupled together, said tubes each having cathode, grid and anode electrodes, and said impedances being connected to the cathodes of the first and third tubes respectively.

4. The amplifying circuit of claim 3, and an output circuit connected to the third tube comprising a transformer having three windings, said load being connected to one winding and said impedances to another.

References Cited in the file of this patent

UNITED STATES PATENTS

| | | |
|---|---|---|
| 2,556,219 | Roche et al. | June 12, 1951 |
| 2,664,469 | Moehring et al. | Dec. 29, 1953 |
| 2,694,143 | Chambers | Nov. 9, 1954 |
| 2,805,289 | Buijs | Sept. 3, 1957 |

FOREIGN PATENTS

| | | |
|---|---|---|
| 584,475 | Great Britain | Jan. 15, 1947 |
| 710,473 | Great Britain | June 16, 1954 |